(12) United States Patent
Durling (10) Patent No.: US 8,974,140 B2
(45) Date of Patent: Mar. 10, 2015

(54) ROTATIONAL ASSEMBLY (75) Inventor: Christopher J. Durling, Bristol (GB)

(73) Assignee: Rolls-Royce PLC, London (GB)

( * ) Notice: Subject to any disclaimer, the term of this patent is extended or adjusted under 35 U.S.C. 154(b) by 216 days.

(21) Appl. No.: 13/439,524

(22) Filed: Apr. 4, 2012

(65) Prior Publication Data

US 2012/0263523 A1     Oct. 18, 2012

(30) Foreign Application Priority Data

Apr. 18, 2011   (GB) .................................. 1106475.5

(51) Int. Cl.
| | | |
|---|---|---|
| *B25G 3/28* | (2006.01) | |
| *F16D 1/076* | (2006.01) | |
| *F16D 1/033* | (2006.01) | |
| *F16D 1/10* | (2006.01) | |

(52) U.S. Cl.
CPC ................ *F16D 1/076* (2013.01); *F16D 1/033* (2013.01); *F16D 1/10* (2013.01); *F16D 2001/103* (2013.01)
USPC ....................... 403/359.6; 403/359.4; 403/357

(58) Field of Classification Search
CPC ............................ F16D 2001/103; F16D 1/087
USPC ............. 403/359.1, 359.2, 359.4, 359.5, 225, 403/298, 355–358
See application file for complete search history.

(56) References Cited

U.S. PATENT DOCUMENTS

| | | | |
|---|---|---|---|
| 3,191,735 A * | 6/1965 | Wavak ....................... 192/110 R |
| 3,364,768 A | 1/1968 | Powell | |
| 4,961,487 A * | 10/1990 | Langeneckert .............. 464/68.3 |
| 6,620,050 B2 * | 9/2003 | Park ............................... 464/162 |
| 6,705,946 B2 * | 3/2004 | Bridges ............................. 464/8 |
| 7,972,078 B2 * | 7/2011 | Igarashi et al. ............ 403/359.6 |
| 2007/0281518 A1 | 12/2007 | Braford, Jr. | |
| 2009/0203453 A1 | 8/2009 | Heinrich et al. | |
| 2010/0254752 A1 * | 10/2010 | Shook .......................... 403/179 |

FOREIGN PATENT DOCUMENTS

| | | |
|---|---|---|
| DE | 195 06 517 A1 | 8/1995 |
| GB | 1132649 | 11/1968 |
| GB | 2 217 430 A | 10/1989 |
| JP | A-06-58341 | 3/1994 |
| JP | A-2009-156438 | 7/2009 |
| TW | 201 125 755 A1 | 8/2011 |

OTHER PUBLICATIONS

British Search Report issued in British Application No. GB1106475.5 on Aug. 16, 2011.
Feb. 19, 2013 Search Report issued in European Application No. 12 16 3110.

* cited by examiner

*Primary Examiner* — Michael P Ferguson
*Assistant Examiner* — Jonathan Masinick
(74) *Attorney, Agent, or Firm* — Oliff PLC (57) ABSTRACT

A rotational assembly comprises a first shaft having a plurality of circumferentially arranged axially extending outer splines on an outer surface thereof and a second shaft having a plurality of circumferentially arranged axially extending inner splines on an inner surface of an axially extending shaft recess. The first shaft is located with the shaft recess such that the outer splines are engaged with the inner splines. At least one biasing element is also provided which is arranged to rotationally bias the first and second shafts towards one another such that the driving faces of the inner and outer splines are forced together.

7 Claims, 9 Drawing Sheets

ROTATIONAL ASSEMBLY

BACKGROUND

The invention relates to a rotational assembly comprising first and second splined shafts that are engaged with one another.

In transmission equipment, splines are commonly used to transmit torque from a driving shaft to a driven shaft. Typically, one shaft has an arrangement of outer splines on an outer surface and the other shaft has a corresponding arrangement of inner splines on an inner surface. In use, the outer splines are engaged with the inner splines in order to transmit drive. Due to machining tolerances, there may be clearance, otherwise known as backlash, lash, or play, between the engaged outer and inner splines.

SUMMARY

If the shafts are attached to one another using bolted flanges, the backlash between the outer and inner splines may result in shear and/or bending forces being induced in the bolts both on start-up and on torque reversal. This is undesirable as it may lead to early component failure. If the coupled shafts are arranged for uni-directional rotation, the shafts may be attached together using bolted flanges, providing that the backlash is taken up on assembly. In such an arrangement special assembly tooling is required to force the driving faces of the outer and inner splines together before the flanges are bolted together. This may be both expensive and time-consuming.

Figure 1:
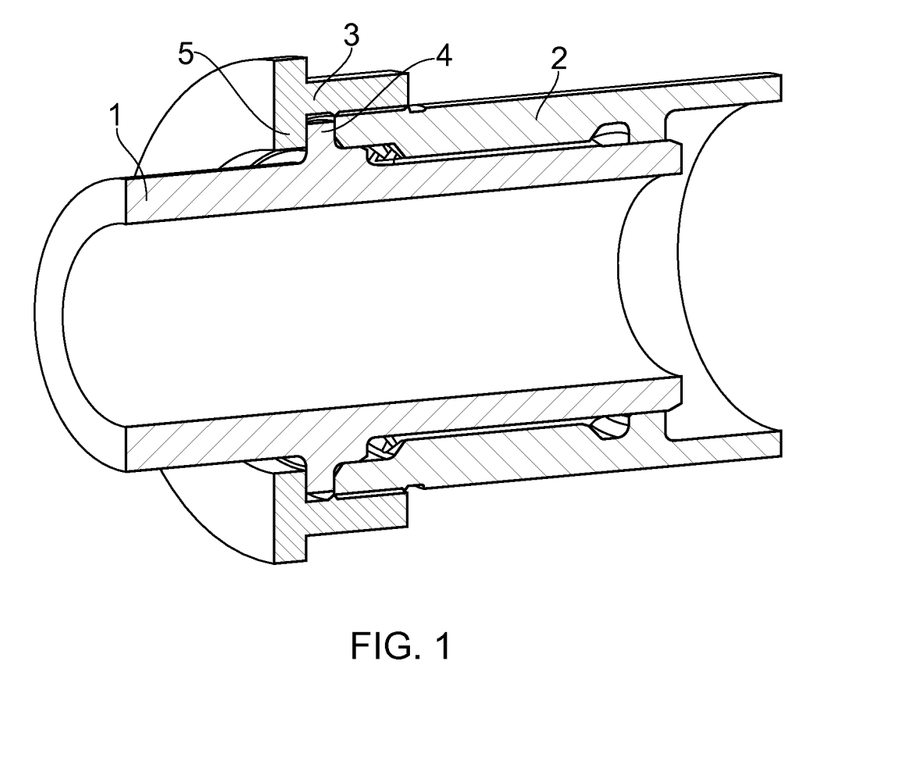
FIG. 1 schematically shows a previously considered arrangement for coupling first and second splined shafts.

As shown in FIG. 1, in an alternative configuration, a collar 3 is used to axially secure first and second splined shafts 1, 2 together. The first shaft 1 has a flange 4 which is retained by the flange 5 of the collar 3 which is threadedly attached to the second shaft 2. This coupling arrangement allows relative rotational movement between the first and second shafts 1, 2 which allows for the backlash between the splines. Whilst this arrangement is satisfactory for some applications, it is not possible to provide the opposite end of the first shaft 1 with a flange or other torque transmission feature having a diameter that is larger than the inner diameter of the collar 3. This may present various design restrictions.

It is therefore desirable to provide an improved rotational assembly which aims to address at least some of the aforementioned disadvantages.

The invention is defined in the attached independent claim to which reference should now be made. Further, optional features may be found in the sub-claims appended thereto.

In a broad aspect the invention concerns a biasing element arranged to rotationally bias first and second splined shafts together such that the driving faces of the splined shafts are forced together. This may reduce or eliminate backlash.

According to an aspect of the invention there is provided a rotational assembly, comprising: a first shaft having a plurality of circumferentially arranged axially extending outer splines on an outer surface thereof, each of the outer splines having a driving face: a second shaft having a plurality of circumferentially arranged axially extending inner splines on an inner surface of an axially extending shaft recess, each of the inner splines having a driving face, wherein the first shaft is located within the shaft recess such that the outer splines are engaged with the inner splines; and at least one biasing element arranged to rotationally bias the first and second shafts towards one another such that the driving faces of the inner and outer splines are forced together. This may reduce or eliminate backlash. The backlash may only be eliminated in one direction. Therefore, the rotational assembly may be arranged for uni-directional rotation.

The or each biasing element may be disposed between the outer surface of the first shaft and the inner surface of the second shaft. At least one biasing element may be mounted to the outer surface of the first shaft. At least one biasing element may be mounted to the inner surface of the second shaft.

The outer surface of the first shaft and/or the inner surface of the second shaft may be provided with at least one mounting portion for mounting at least one biasing element to the shaft. The or each mounting portion may comprise a mounting peg, and a biasing element may be mounted on the mounting peg. The biasing element may comprise a recess, opening or slot within which the mounting peg may be located. This may prevent the movement of the biasing element during and after installation. The or each mounting portion may comprise first and second axially spaced mounting pegs, and a biasing element may be mounted on the first and second mounting pegs. The biasing element may comprise first and second recesses, openings or slots within which the first and second mounting pegs may be located. The first and second pegs may have different geometries. This may prevent incorrect assembly.

At least one biasing element may be located between adjacent outer splines. At least one biasing element may be located between adjacent inner splines. The biasing element may be located in a position in which a spline would normally be present. Therefore, it may be necessary to sacrifice a spline in order to incorporate a biasing element. If mounting portions are used, they may be positioned between adjacent outer or inner splines. Depending on the length of the splines, only a part of the length of a spline may need to be sacrificed in order to incorporate a biasing element.

There may be a plurality of biasing elements, each arranged to rotationally bias the first and second shafts towards one another. At least one biasing element may be mounted to the outer surface of the first shaft and at least one biasing element may be mounted to the inner surface of the second shaft. The biasing elements may be circumferentially spaced from one another, for example, by 180°. There may be a plurality of biasing elements mounted to the outer surface of the first shaft. The biasing elements may be circumferentially arranged around the shaft. There may be a plurality of biasing elements mounted to the inner surface of the second shaft. The biasing elements may be circumferentially arranged around the shaft.

The or each biasing element may be at least partially deformable. The or each biasing element may be at least partially resiliently deformable. At least one biasing element may comprise an outwardly curved portion which acts on the non-driving face of an inner spline so as to rotationally bias the first and second shafts towards one another. If the biasing element is to be mounted to a mounting portion having first and second mounting pegs, the biasing element may comprises a central portion that in use is deformed in a region between the first and second pegs. At least one biasing element may comprise an outwardly curved portion which acts on the non-driving face of an outer spline so as to rotationally bias the first and second shafts towards one another. The central portion, if present, may comprise the outwardly curved portion.

The or each biasing element may be substantially axially extending. The forward end of the biasing element may have a lead-in feature, or taper, for ease of assembly. The biasing element may be provided with stiffening features, or with a projection or tab to prevent the biasing element from being incorrectly mounted.

The or each biasing element may comprise metal or a plastics material. The biasing element may be formed by injection moulding, machining, casting, forging and may be formed from sheet material.

The first shaft may be provided with a first flange and the second shaft may be provided with a second flange such that the first and second shafts can be attached together by means of the first and second flanges.

The invention also concerns a gas turbine engine comprising a rotational assembly in accordance with any statement herein.

According to a further aspect of the invention there is provided a rotational assembly, comprising: a first shaft having a first spline; a second shaft having a second spline that is arranged to be engaged with the first spline; and at least one biasing element arranged to rotationally bias the first and second shafts towards one another such that the first and second splines are forced together.

The invention may comprise any combination of the features and/or limitations referred to herein, except combinations of such features as are mutually exclusive.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 2:
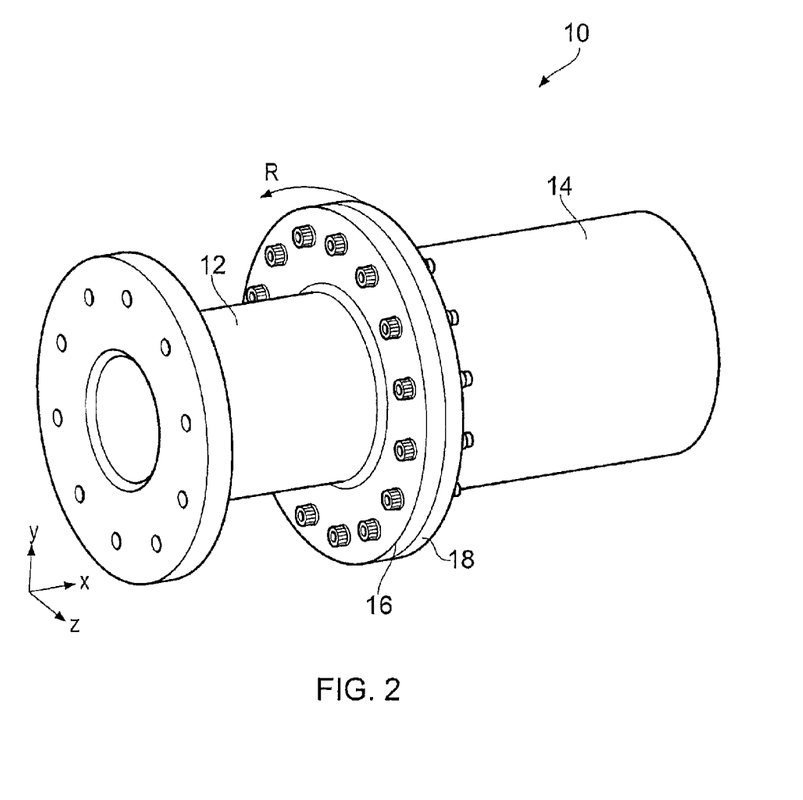
FIG. 2 schematically shows a rotational assembly in accordance with an embodiment of the invention.

FIG. 2 shows the rotational assembly 10 comprising first shaft 12 and a second shaft 14 attached together. The first and second shafts 12, 14 are attached such that they can transmit a torque. In this embodiment the first shaft 12 is the driving shaft and the second shaft 14 is the driven shaft. However, in other embodiments the second shaft 14 may be the driving shaft, or either shaft 12, 14 may be capable of being the driving shaft. Also, in this embodiment the rotational assembly 10 is arranged for uni-directional rotation in the direction R indicated in FIG. 2.

The first shaft 12 comprises a first flange 16 and the second shaft 14 comprises a second shaft 18 and when assembled the shafts 12, 14 are attached together by bolting the flanges 16, 18 together. The bolted flanges 16, 18 axially secure the shafts together. However, the first shaft and second shafts 12, 14 are also splined together using an outer (or external) spline and an inner (or internal) spline in order to transmit the torque between the shafts 12, 14.

Figure 3:
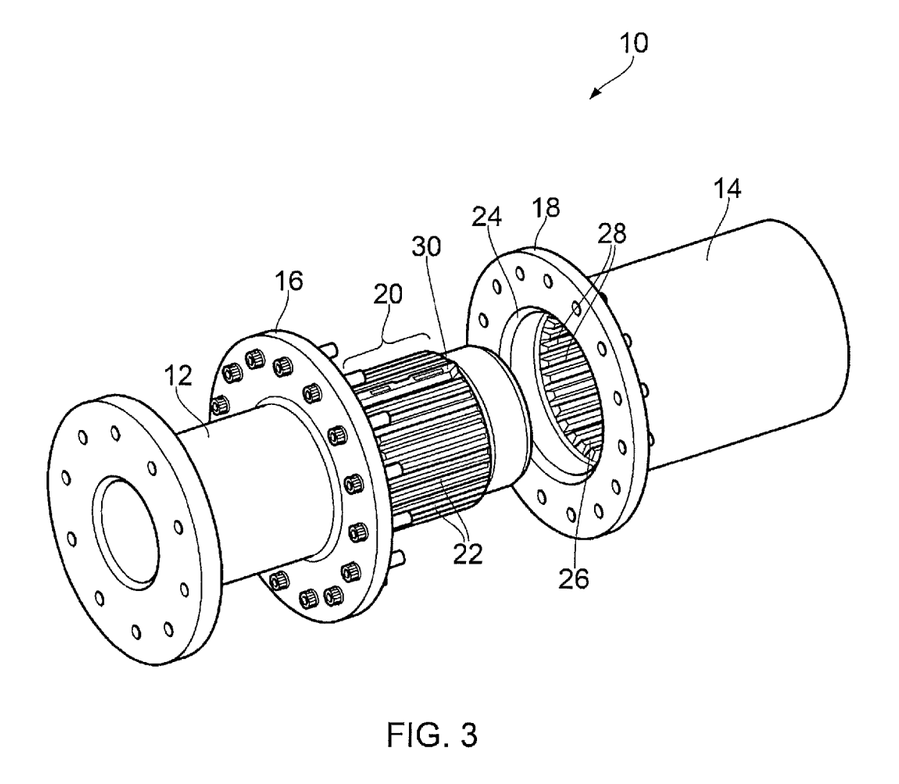
FIG. 3 schematically shows an exploded view of the rotational assembly of FIG. 2.

As shown in FIG. 3, the first shaft 12 comprises an outer splined portion 20 which is provided towards one of the ends of the first shaft 12. The outer splined portion 20 comprises a plurality of circumferentially arranged and axially extending outer splines 22 provided on an outer surface of the first shaft 12. The outer splines 22 are all substantially the same length and are equally spaced around the circumference of the shaft. The proximal ends of the splines 22 terminate in front of the first flange 16. The second shaft 14 comprises an axially extending shaft recess 24 that is coaxial with the second shaft 14 and is arranged to receive the outer splined portion 20 of the first shaft 12. The second shaft 14 comprises an inner splined portion 26 that is provided towards the end of the shaft recess 24. The inner splined portion 26 corresponds to the outer splined portion 20 and comprises a plurality of circumferentially arranged and axially extending inner splines 28 that are provided on an inner surface of the shaft recess 24 of the second shaft 14. The inner splines 28 are all substantially the same length and are equally spaced around the circumference of the shaft recess 24. The geometry and spacing of the outer splines 22 corresponds to the geometry and spacing of the inner splines 28 such that the outer splines 22 can be engaged with the inner splines 28 in order to transmit torque between the first and second shafts 12, 14.

Figure 3A:
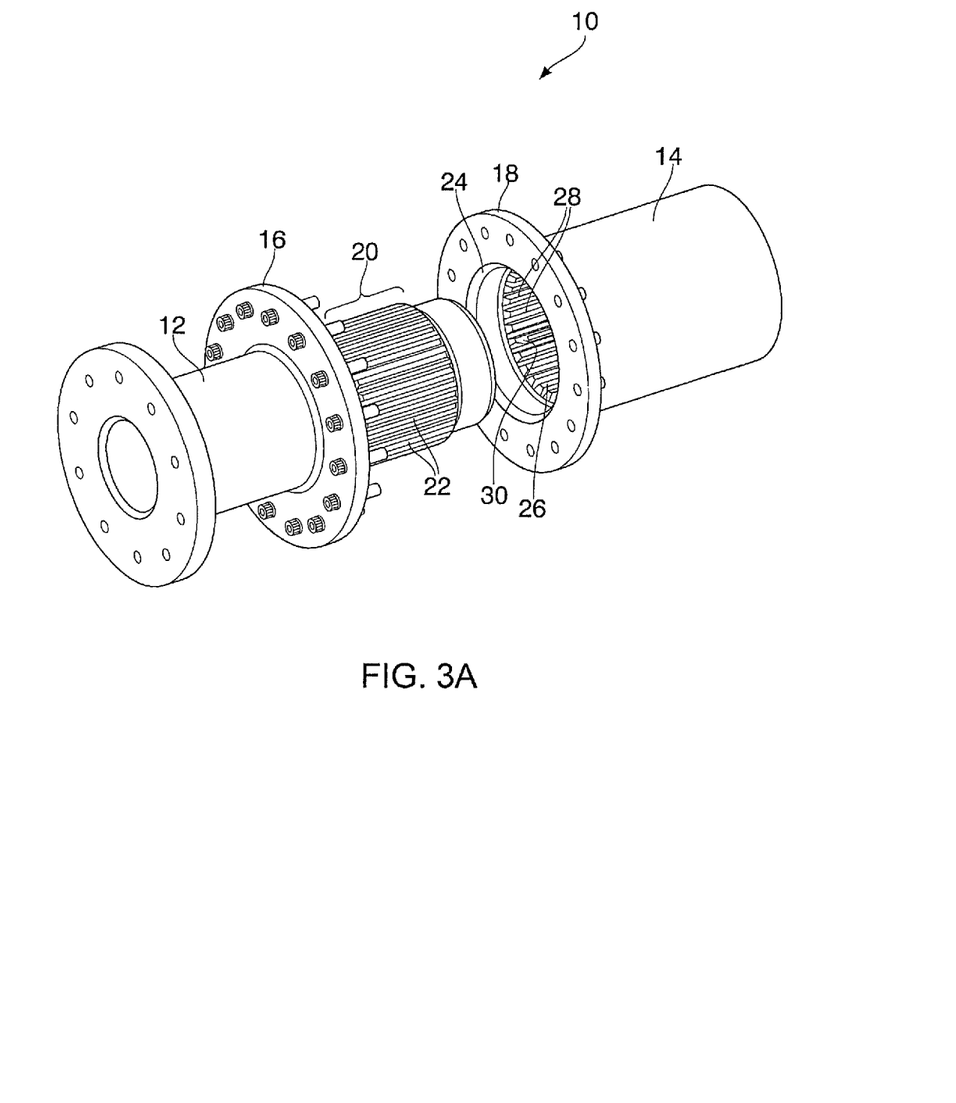
FIG. 3A schematically shows another exploded view of the rotational assembly of FIG. 2.

In order to reduce or eliminate the backlash, or clearance, between the driving faces of the outer and inner splines, a biasing element 30 is provided which rotationally biases the first and second shafts 12, 14 together such that the driving faces of the outer and inner splines 22, 28 are forced together. In this particular embodiment there is a single biasing element 30 that is mounted to the outer surface of the first shaft 12 so as to rotationally bias the second shaft 14 towards the first shaft 12 so as to force the driving faces of the splines together. However, it should be appreciated that the biasing element 30 could be mounted to the second shaft 14 (FIG. 3A), or there could be a plurality of biasing elements. For example, all of the biasing elements 30 could be mounted to one shaft, or at least one biasing element 30 could be mounted to each shaft.

As can be seen from FIG. 3, the biasing element 30 is substantially axially extending and is disposed between adjacent outer splines 22. In order to accommodate the biasing element 30, one outer spline 22 is removed (or sacrificed). However, the arrangement is such that the necessary torque can still be transmitted. If the axial length of the biasing element 30 is less than the axial length of the splines, only a part of the axial length of a spline may need to be removed in order to accommodate the biasing element.

Figure 4:
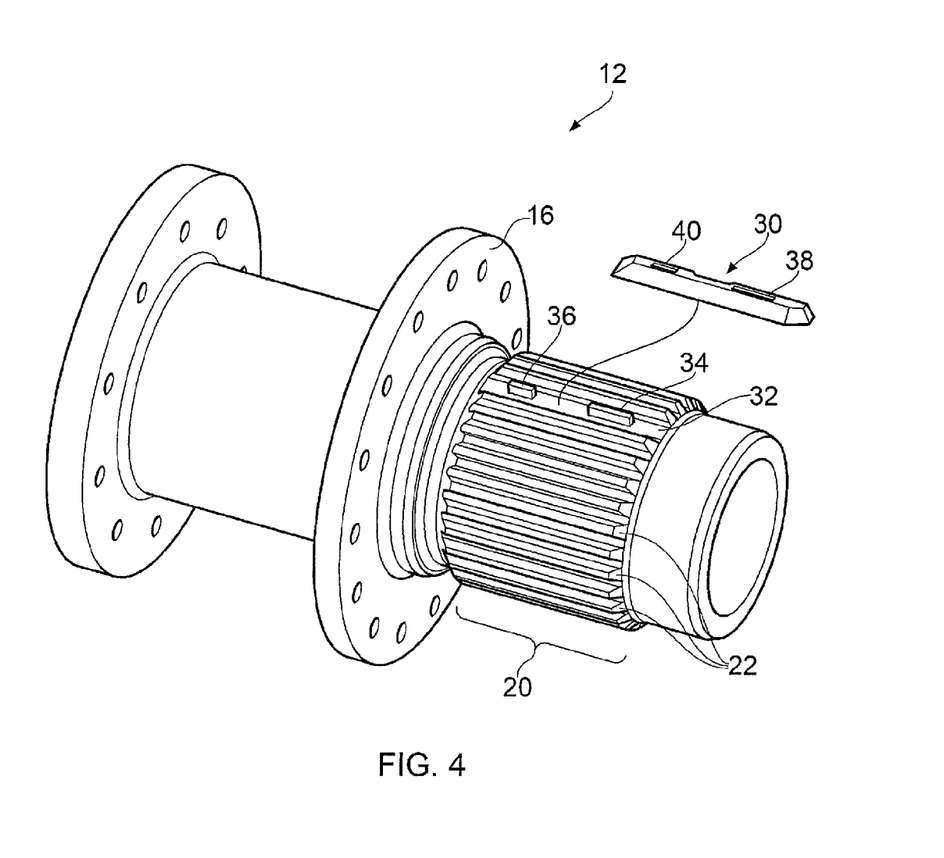
FIG. 4 schematically shows an enlarged view of the end of the first shaft of FIG. 3.

With reference to FIG. 4, the outer surface of the first shaft 12 comprises a mounting portion 32 which is positioned between adjacent outer splines 22 and is in place of an outer spline 22. The mounting portion 32 is used to detachably mount a biasing element 30 to the outer surface of the first shaft 12. In this embodiment the mounting portion 32 comprises first and second mounting pegs 34, 36 that are axially spaced from one another. The first and second mounting pegs 34, 36 are of different lengths which helps to ensure that the biasing element 30 is not incorrectly mounted to the first shaft 12. The biasing element 30 comprises first and second mounting openings 38, 40 that correspond to the first and second mounting pegs 34, 38. In order to mount the biasing element 30 to the first shaft 12, the first mounting peg 34 is located within the first mounting opening 38 and the second mounting peg 36 is located within the second mounting opening 40. In this embodiment there is a friction fit between the pegs 34, 36 and the openings 38, 40 which helps to ensure that prior to assembly the biasing element 30 does not become detached from the shaft 12.

Figure 5A:
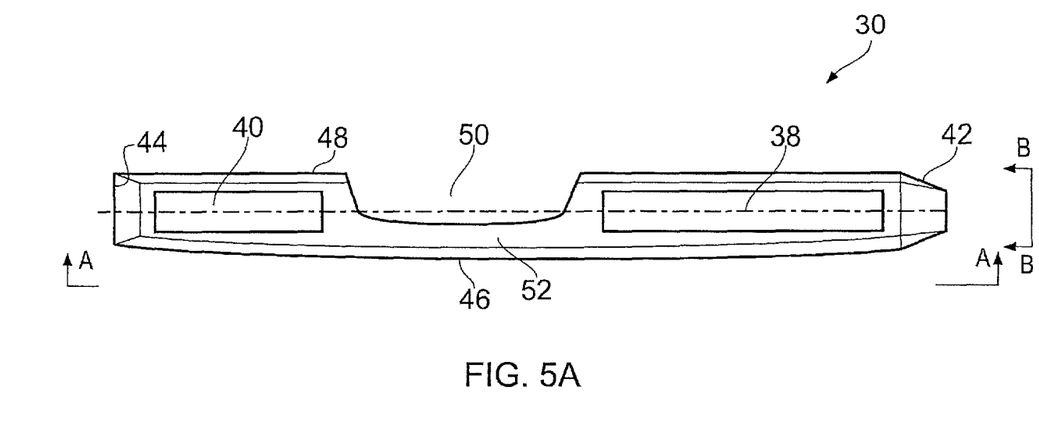
FIGS. 5A-5C schematically show the biasing element of the rotational assembly of FIGS. 2 and 3.
Figure 5B:
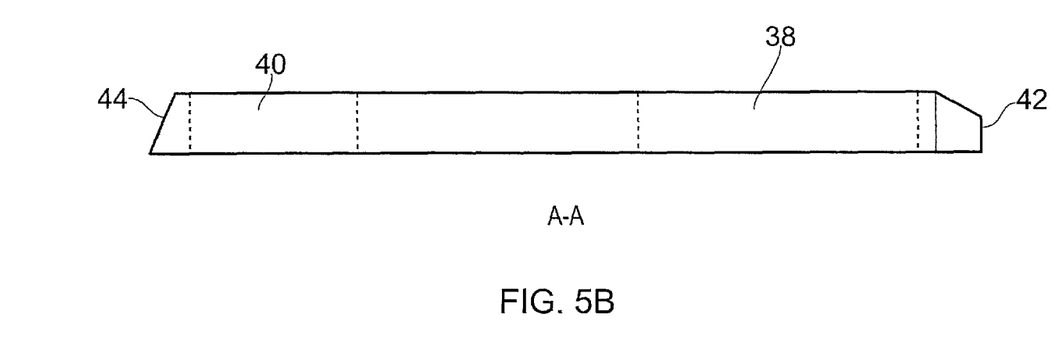
Figure 5C:
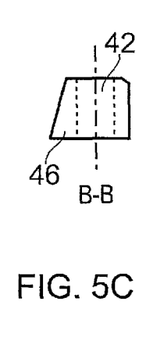

As shown in FIGS. 5A-5C, the biasing element 30 is substantially axially extending and has a front end 42 and a rear end 44. The first mounting opening 38 is provided towards the front end 42 of the biasing element 30 and the second mounting opening 40 is provided towards the rear end of the biasing element 30. The mounting openings 38, 40 extend in the radial direction through the entire thickness of the biasing element. The front end 42 is also tapered and provides a lead-in feature such that when the first shaft 12 is inserted into the shaft recess 24, the biasing element 30 is not snagged or damaged.

The biasing element 30 also comprises first and second sides 46, 48. The first side 46 is curved outwardly and may therefore be referred to as a curved portion or side. As can be seen from B-B, the first side 46 of the biasing element 30 is also sloped and corresponds to the shape of the non-driven face of the inner spline 28 against which it acts in use. The second side 48 is provided with a recess or cut-out 50 in a position between the first and second mounting openings 38, 40.

The biasing element 30 in this embodiment is resiliently deformable and may be made from a plastics material, for example. However, it should be appreciated that any suitable material, such as a metal, may be used. The reduced width of the biasing element 30 in the region of the cut-out provides resiliently deformable curved spring portion 52 in between the first and second mounting openings 38, 40.

In order to assemble the rotational assembly 10, the biasing element 30 is mounted to the outer surface of the first shaft 12 using the mounting portion by locating the first and second mounting pegs 34, 36 in the first and second mounting openings 38, 40. The end of the first shaft 12 is then inserted into the shaft recess 24 of the second shaft 14 so that the outer splines 22 are engaged with the inner splines 28. Therefore when assembled, the biasing element 30 is disposed between the first and second shafts 12, 14. Specifically, the biasing element 30 is disposed between the outer surface of the first shaft 12 and the inner surface of the shaft recess 24 of the second shaft 14.

Figure 6:
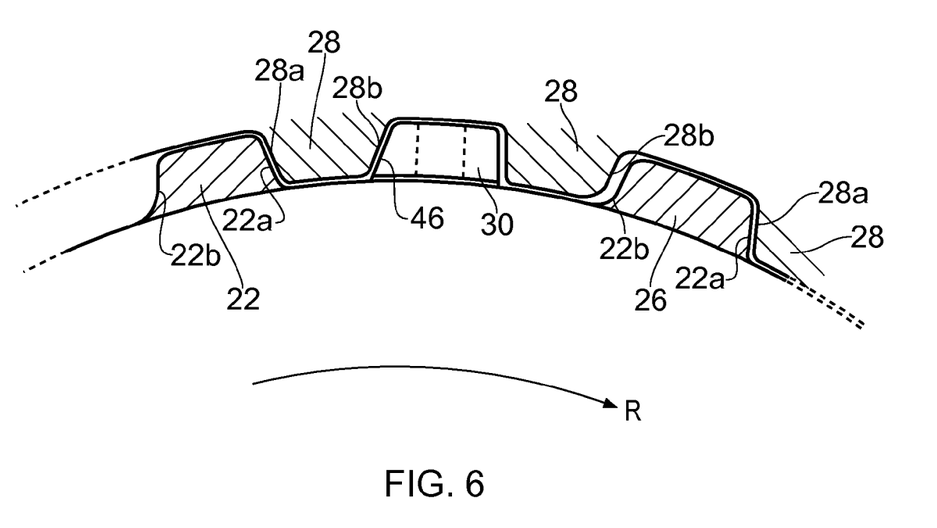
FIG. 6 schematically shows a cross-sectional view through splined first and second shafts.
Figure 7:
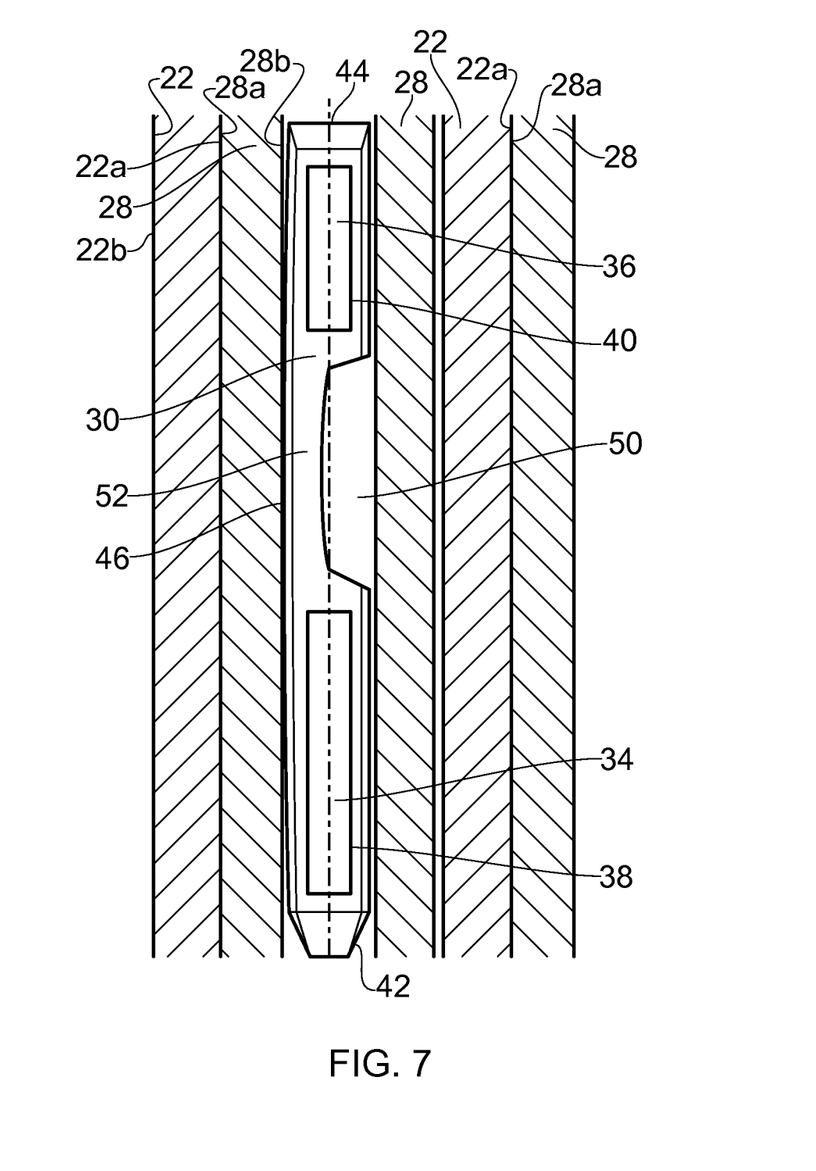
FIG. 7 schematically shows a plan view of first and second splined shafts.

As can be seen in FIG. 6, when assembled, the first curved side 48 of the biasing element 30 acts on the non-driving face 28b of an inner spline 28 so as to automatically rotationally bias the second shaft 14 towards the first shaft 12. As seen in FIG. 7, the curved spring portion 46 is resiliently deformed so as to provide the resilient biasing force and the curved portion 46 is inwardly deformed into the cut-out 50 provided in the second side 48. The rotational bias exerted by the biasing element causes the driving face 28a of each inner spline 28 to be forced together with the driving face 22a of each corresponding outer spline 22 such that they are touching. There is therefore little, or no, backlash between the driving face 22a of the outer splines 22 and the driving face 28a of the inner splines. Accordingly, when the first shaft 12 starts to rotate in the direction R, the torque is immediately transferred to the second shaft 14.

Once the splines of the first and second shafts 12, 14 have been engaged with the biasing element 30 disposed between them, the first and second flanges 16, 18 can be bolted together. In this configuration the shafts 12, 14 are bolted together with the driving faces 22a of the outer splines 22 and the driving faces 28a of the inner splines 28 in contact. This means that when the first driving shaft 12 is rotated, there is no backlash or relative movement between the first and second shafts 12, 14. This ensures that no bending or shear forces are induced in the bolts through the flanges 16, 18. Further, as can be seen from FIG. 2, one, or indeed both, shafts can be provided with a flange or other torque transmission feature without interfering with the connection method. The rotational assembly is also simple to assemble since no specialist tooling is required to bias the first and second shafts together as the biasing is provided by the biasing element.

Figure 8A:
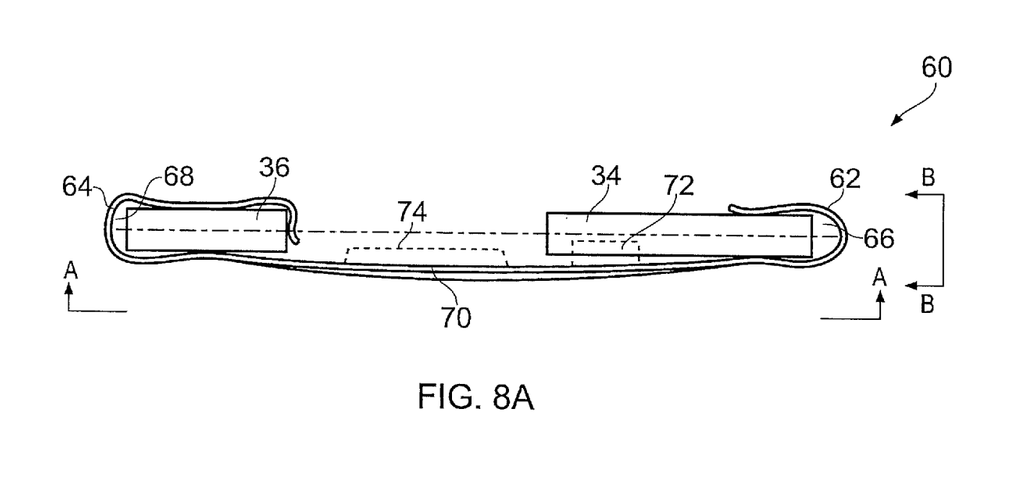
FIGS. 8A-8C schematically show an alternative biasing element.
Figure 8B:
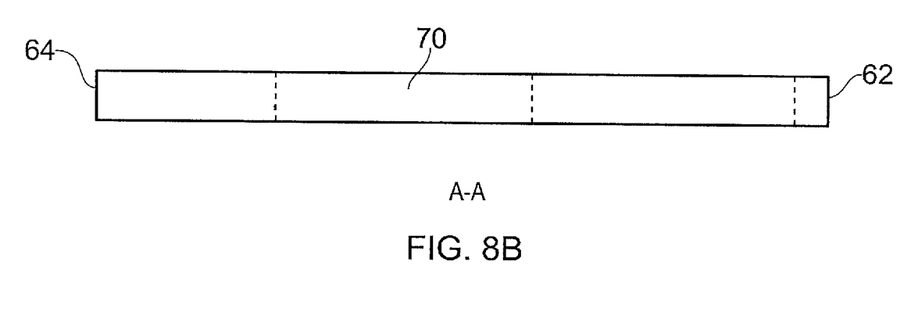
Figure 8C:
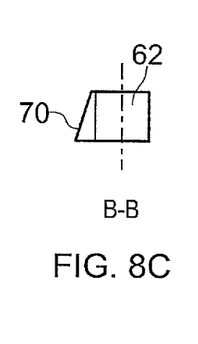

FIGS. 8A-8C illustrate a second type of biasing element 60 that may be used instead of the biasing element 30 of the above described embodiment. In this embodiment the biasing element 60 is made from sheet metal folded into shape. As for the first embodiment, the biasing element 60 is substantially axially extending and comprises a front end 62 and a rear end 64. The front end 62 is tapered slightly so as to provide a lead-in feature. A first mounting slot 66 is provided towards the front end 62 of the biasing element 60 and a second mounting slot 68 is provided towards the rear end 64 of the biasing element 60. As can be seen in FIG. 8, the first mounting slot 66 is arranged to receive the first mounting peg 34 and the second mounting slot 68 is arranged to receive the second mounting peg 36. The first and second mounting slots 66, 68 are formed by bending the sheet metal back on itself. The biasing element 60 further comprises a curved side 70 that connects the first and second mounting slots 66, 68 and is outwardly curved. The curved side 70 is resiliently deformable and is also sloped so as to correspond to the shape of the spline against which it acts. If necessary, the biasing element 60 may be provided with a tab 72 to prevent it from being inserted upside down. The biasing element may also be provided with a return feature 74 which would stiffen the curved side 70.

In use, the biasing element 60 works in exactly the same way so as to rotationally bias the first and second shafts together 12, 14 such that the driving faces of the splines are forced together. This eliminates or reduces any play between the splines and therefore prevents stresses from being induced in the bolted flanges.

The invention claimed is:

1. A rotational assembly, comprising:
 a first shaft having a plurality of circumferentially arranged axially extending outer splines on an outer surface thereof, each of the outer splines having a driving face;
 a second shaft having a plurality of circumferentially arranged axially extending inner splines on an inner surface of an axially extending shaft recess, each of the inner splines having a driving face and a non-driving face;
 wherein the first shaft is located within the shaft recess such that the outer splines are engaged with the inner splines; and
 at least one biasing element mounted to the outer surface of the first shaft and arranged to rotationally bias the first and second shafts towards one another such that the driving faces of the inner and outer splines are forced together, the or each biasing element having a first side and an opposite second side, the first side matching with the non-driving face of a corresponding inner spline;
 the outer surface of the first shaft provided with at least one mounting portion comprising first and second axially spaced mounting pegs upon which first and second apertures in the biasing element are mounted, the or each biasing element having a cut-out in a position between the first and second apertures on the second side of the or each biasing element to provide a reduced width portion for the or each biasing element and thus a resiliently deformable curved portion between the first and second apertures.

2. A rotational assembly according to claim 1, wherein the or each biasing element is disposed between the outer surface of the first shaft and the inner surface of the second shaft.

3. A rotational assembly according to claim 1, wherein the at least one biasing element mounted to the outer surface of the first shaft is located between adjacent outer splines.

4. A rotational assembly according to claim 1, wherein the at least one biasing element mounted to the outer surface of the first shaft includes a plurality of biasing elements, each arranged to rotationally bias the first and second shafts towards one another.

5. A rotational assembly according to claim 1, wherein the or each biasing element comprises an outwardly curved portion which acts on the non-driving face of the corresponding inner spline so as to rotationally bias the first and second shafts towards one another.

6. A rotational assembly according to claim 1, wherein the or each biasing element comprises metal or a plastics material.

7. A rotational assembly, comprising:
- a first shaft having a plurality of circumferentially arranged axially extending outer splines on an outer surface thereof, each of the outer splines having a driving face and a non-driving face;
- a second shaft having a plurality of circumferentially arranged axially extending inner splines on an inner surface of an axially extending shaft recess, each of the inner splines having a driving face;
- wherein the first shaft is located within the shaft recess such that the outer splines are engaged with the inner splines; and
- at least one biasing element mounted to the inner surface of the second shaft, and arranged to rotationally bias the first and second shafts towards one another such that the driving faces of the inner and outer splines are forced together, the or each biasing element having a first side and an opposite second side, the first side being sloped to match with the non-driving face of a corresponding outer spline;
- the inner surface of the second shaft provided with at least one mounting portion comprising first and second axially spaced mounting pegs upon which first and second apertures in the biasing element are mounted, the or each biasing element having a cut-out in a position between the first and second apertures on the second side of the or each biasing element to provide a reduced width portion for the or each biasing element and thus a resiliently deformable curved portion between the first and second apertures.

* * * * *